United States Patent
Schwaighofer et al.

(10) Patent No.: US 10,648,047 B2
(45) Date of Patent: May 12, 2020

(54) METHOD FOR PRODUCING BREATHABLE LEATHER MATERIAL AND USE OF LEATHER MATERIAL PRODUCED ACCORDING TO SAID METHOD

(71) Applicant: Bayerische Motoren Werke Aktiengesellschaft, Munich (DE)

(72) Inventors: Armin Schwaighofer, Munich (DE); Florian Langlechner, Muehldorf am Inn (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 536 days.

(21) Appl. No.: 15/378,270

(22) Filed: Dec. 14, 2016

(65) Prior Publication Data

US 2017/0088909 A1    Mar. 30, 2017

Related U.S. Application Data

(63) Continuation of application No. PCT/EP2015/059480, filed on Apr. 30, 2015.

(30) Foreign Application Priority Data

Jun. 16, 2014  (DE) .................. 10 2014 211 511

(51) Int. Cl.
*C14B 5/00* (2006.01)
*C14B 7/02* (2006.01)
(Continued)

(52) U.S. Cl.
CPC .................. *C14B 5/00* (2013.01); *B60N 2/58* (2013.01); *B60R 13/02* (2013.01); *C14B 7/02* (2013.01); *C14C 11/00* (2013.01)

(58) Field of Classification Search
CPC .................................. C14C 11/00; C14B 7/02
See application file for complete search history.

(56) References Cited

U.S. PATENT DOCUMENTS

| | | |
|---|---|---|
| 3,809,597 A | 5/1974 | Connett |
| 4,581,261 A | 4/1986 | Schaefer et al. |

(Continued)

FOREIGN PATENT DOCUMENTS

| | | |
|---|---|---|
| CN | 1906311 A | 1/2007 |
| DE | 2 235 239 | 2/1973 |

(Continued)

OTHER PUBLICATIONS

International Search Report (PCT/ISA/210) issued in PCT Application No. PCE/EP2015/059480 dated Aug. 5, 2015, with English translation (six (6) pages).

(Continued)

*Primary Examiner* — Shaun R Hurley
(74) *Attorney, Agent, or Firm* — Crowell & Moring LLP

(57) ABSTRACT

A method is provided for producing breathable leather material including the following steps: a leather-based material is provided; the leather-based material is perforated; a support body is provided; a finishing is applied to the support body such that a later visible side of the finishing is facing the support body and the finishing is transferred to the surface of the perforated leather-based material and removed from the support body.

14 Claims, 1 Drawing Sheet

(51) Int. Cl.
  *C14C 11/00*   (2006.01)
  *B60R 13/02*   (2006.01)
  *B60N 2/58*    (2006.01)

(56) References Cited

U.S. PATENT DOCUMENTS

| | | | |
|---|---|---|---|
| 6,177,198 B1 | 1/2001 | Schaefer | |
| 8,776,554 B2 * | 7/2014 | Chen | C14B 1/58 69/21 |
| 2007/0082176 A1 | 4/2007 | Schaefer | |
| 2010/0263235 A1 | 10/2010 | Schaefer | |
| 2013/0263354 A1 * | 10/2013 | Gibby | A63B 71/14 2/161.1 |
| 2014/0101974 A1 * | 4/2014 | Schaefer | A43B 7/125 36/109 |

FOREIGN PATENT DOCUMENTS

| | | |
|---|---|---|
| DE | 298 12 075 U1 | 9/1998 |
| DE | 20 2006 011 724 U1 | 1/2008 |
| EP | 0 105 046 A2 | 4/1984 |
| EP | 0 362 684 A2 | 4/1990 |
| GB | 1 268 763 | 3/1972 |
| WO | WO 2005/047549 A1 | 5/2005 |
| WO | WO 2009/049728 A2 | 4/2009 |

OTHER PUBLICATIONS

German Search Report issued in counterpart German Application No. 10 2014 211 511.6 dated Feb. 18, 2015, with partial English translation (thirteen (13) pages).

Chinese-language Office Action issued in counterpart Chinese Application No. 201580016547.3 dated Dec. 5, 2017 with English translation (14 pages).

* cited by examiner

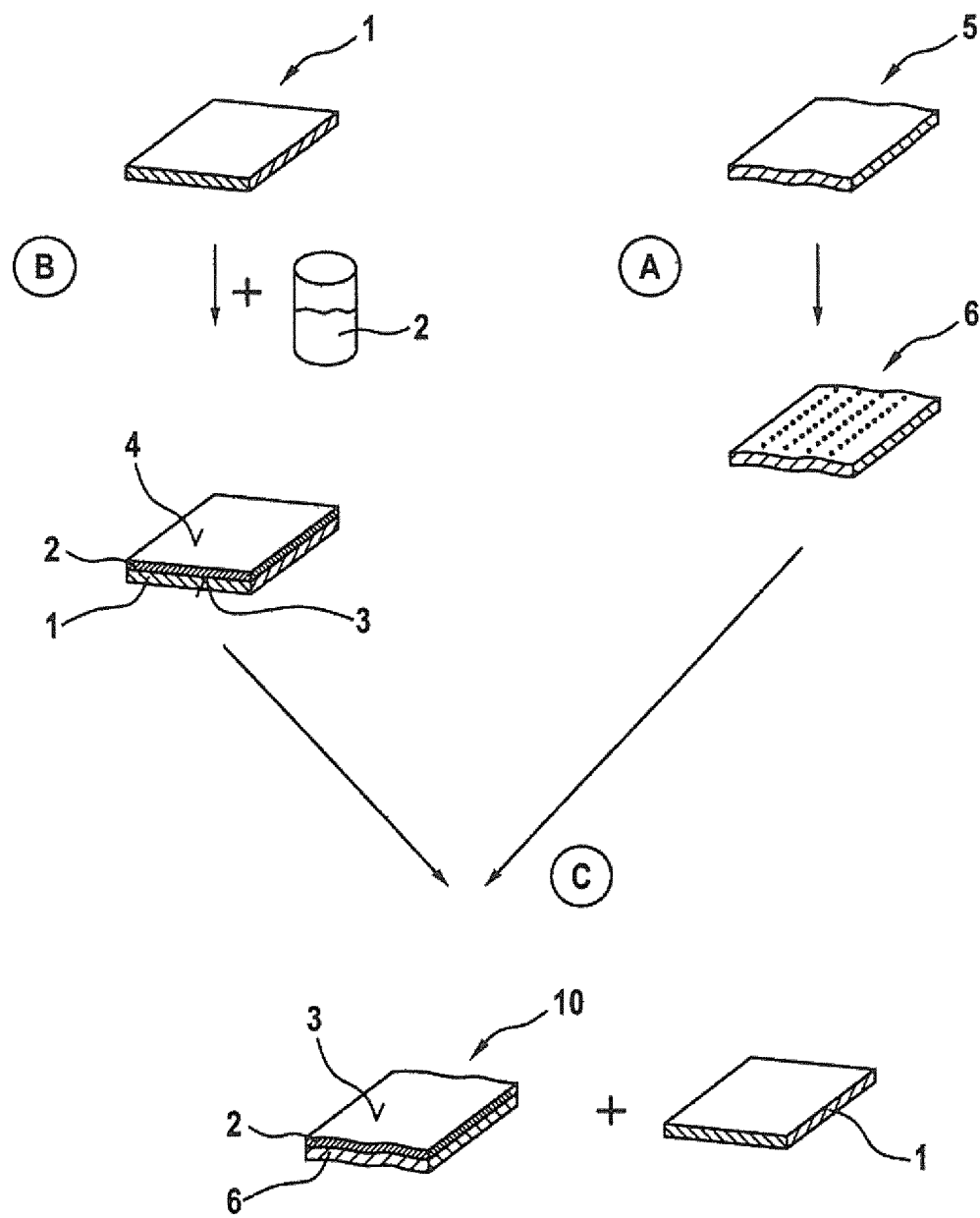

METHOD FOR PRODUCING BREATHABLE LEATHER MATERIAL AND USE OF LEATHER MATERIAL PRODUCED ACCORDING TO SAID METHOD

CROSS REFERENCE TO RELATED APPLICATIONS

This application is a continuation of PCT International Application No. PCT/EP2015/059480, filed Apr. 30, 2015, which claims priority under 35 U.S.C. § 119 from German Patent Application No. 10 2014 211 511.6, filed Jun. 16, 2014, the entire disclosures of which are herein expressly incorporated by reference.

BACKGROUND AND SUMMARY OF THE INVENTION

The present invention relates to a method for producing breathable leather material as well as the use of a leather material produced according to the method.

Leather materials, which are to say natural leather and also synthetic leather, are used widely in the textile industry, but also in the field of motor vehicle equipment. Until a leather material can be provided for further processing, it is subjected to a complex production process. For example, natural leather, which is to say raw leather, is tanned, stretched, walked and finally provided with a finishing that makes the leather more durable and, most of all, resistant to stains and permanently water-repellent. The finishing can include one or more layers, including pigment-carrying layers. To ensure that the quality of the leather material remains continuously good, it has to be breathable so that, for example, moisture does not adhere to the leather material and lead to mould stains there. To that end, in a final step, the leather material is mechanically perforated after the finishing has been applied. In this process, it is a disadvantage that the perforation, which is added later, leads to a strong adverse optical effect on the surface of the leather material and, therefore, mars the appearance of said surface.

Proceeding from this prior art, it is therefore the object of the present invention to provide a method for producing a breathable leather material, which is easily realizable and avoids any adverse optical effects on the appearance of the leather material. Furthermore, it is an object of the invention to provide a use for leather material produced according to the method.

These and other objects of the invention are achieved by a method for producing breathable leather material according to the invention, with the acts of: i) providing a leather-based material; ii) perforating the leather-based material; iii) providing a support body; iv) applying a finishing to the support body so that a later visible side of the finishing faces the support body; and v) transferring the finishing to a surface of the leather-based material and removing the support body.

According to the invention, the term "leather material" encompasses any natural leather product as well as synthetic leather or leather-like textile material. Perforating only the leather-based material before applying the finishing achieves the following effects: for one, it makes the leather-based material breathable. Because the finishing is applied to the perforated surface of the leather-based material in a further step, the perforations are furthermore optically masked. So as not to reduce the breathability of the leather material, a special application method is used to apply the finishing to the leather-based material, that is to say, a transfer of a finishing applied in advance to a support body. If the finishing were applied directly to the leather material, which in this case is already perforated, by spraying, rolling or by dipping the leather-based material into a finishing preparation, the finishing would clog the perforations because of the viscosity of the finishing preparation. This is prevented with the method according to the invention. The finishing is performed by the local, punctiform or planar application to the support body, for example, of a film material, and loses its flowability to the extent that it does not flow off the support body, but nevertheless has good adhesion properties on the leather-based material. However, any flow into the perforation is prevented. Therefore, a mechanical aftertreatment to develop the breathable properties is not necessary. The method can be realized in a simple fashion without any high technical effort by combining standard processes. Furthermore, a precise punctiform application of the finishing on the leather-based material can be performed, which promotes an economical use of the finishing in terms of material and lowers the costs of the method according to the invention.

An advantageous modification of the method according to the invention is characterized in that the finishing is applied punctiformly to the support body. This not only increases the efficiency of the material but also improves the breathability of the leather material. Because of the punctiform application of the finishing to the support body, the application pattern is retained even after the finishing is transferred to the surface of the leather-based material. Thus, the finishing itself is effectively "perforated." The application of a "perforated" finishing cannot be realized in a satisfactory fashion with the previous methods. An application of the finishing by means of a screen-printing process has turned out to be especially advantageous in terms of a simple, technical implementability.

An additional improvement of the breathability of the leather material can be achieved in that the support body is perforated before the finishing is applied.

For the same reason, the support body and the finishing can also be perforated before the finishing is transferred to the surface of the leather-based material.

Because of the statistical distribution of the perforation holes in the leather-based material and also in the finishing and/or in the support material and the finishing, whether through punctiform application of the finishing or through perforation of the support body and/or the finishing, a large part of the perforations in the leather-based material is covered so that there is a low adverse optical effect, but a leather-based material with good breathable properties can be provided.

Transferring the finishing to the desired surface areas of the leather-based material can occur in any way that generates sufficient adhesion of the finishing on the leather-based material and facilitates a largely residue-free removal of the support body. Under these aspects, it is preferred that the support body and/or the finishing are heated to transfer the finishing. Heating the support body and/or the finishing reduces the adhesion of the finishing to the support body and facilitates a bonding to the leather-based material. Preferably, a non-stick coated support body, for example a silicon-modified film, which additionally facilitates a removal of the finishing from the support body, is used as the support body. Other auxiliary devices, such as a scraping off device, for example, are also advantageously possible.

The adhesion of the finishing at the surface of the leather-based material can be improved by pressing the exposed side of the finishing to the surface of the leather-based material to transfer the finishing. This can be done, for example, by means of a stamp or a roller.

The finishing that is used is not limited per se and is selected depending on the desired surface property of the leather material. In particular, the finishing comprises a primer and a coloring preparation, such as, for example, a pigment dispersion and/or a topcoat. In particular, the topcoat thus seals the surface and makes it scratchproof and dirt- and water-repellent. The preparation can be applied in one or in multiple coats, at the same time or successively, using the method according to the invention.

To produce an especially high-quality natural leather product, the leather-based material is a natural leather, and is first tanned, stretched and/or walked before it is provided.

Also according to the invention, the use of a leather material produced according to the method described above is described, which in particular comprises the production of a molded skin and/or a motor vehicle trim element, in particular an instrument panel, a center console, a door trim, or a seat cover, with breathable properties.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic diagram illustrating the method according to an exemplary embodiment of the invention.

DETAILED DESCRIPTION OF THE DRAWING

The present invention is explained using a detailed exemplary embodiment. FIG. 1 shows only the aspects of the method according to the invention that are of interest here; all remaining aspects have been omitted for reasons of clarity.

FIG. 1 provides a detailed overview of all invention-essential steps of the method according to the invention for the production of a breathable leather material 10. In a first method strand, a leather-based material 5 is provided. This, for example, may be a natural leather or a synthetic leather, wherein the natural leather can also be present in tanned, stretched and walked form. In a first step A, the leather-based material 5 is perforated. This can be done by means of conventional methods, for example in a rolling process. Thus, the perforation pattern is not limited, but it is designed such that the leather-based material 5 has good breathability.

In a second method strand, a support body 1 is provided, for example a non-stick coated film. Likewise, a finishing 2 is provided. The finishing can be a primer, a coloring preparation and/or a topcoat preparation. Thus, the individual components can be held available as separate preparations or as a compound preparation.

In a method step B, the finishing 2 is applied to the support body 1. This can be done by means of the usual methods, such as, for example, spraying, rolling, brushing or the like, preferably punctiformly, but also planar. In this way, a support body 1 coated with a finishing 2 is obtained. The finishing 2 has two surfaces, a first surface 3 and a second surface 4. The first surface 3 faces the support body 1 and, after the finishing 2 has been transferred to the perforated leather-based material 6, forms the visible side of the leather material 10. The second surface 4 is for connecting to the surface of the perforated leather-based material 6.

In a further method step C, the finishing 2 is transferred to a surface of the perforated leather-based material 6 while removing the support body 1. In this step, the support body 1 and/or the finishing 2 is preferably heated and the second surface 4 of the finishing 2 is pressed to the surface of the perforated leather-based material 6.

Depending on whether the finishing 2 is a compound preparation or comprises a plurality of separate preparations, additional application steps of a finishing, as shown in the method strand B, may follow. For example, it is also possible to produce a multi-layered leather-based material, which may also have different local surface properties or colors.

LIST OF REFERENCE SYMBOLS

1 Support body
2 Finishing
3 First surface of the finishing
4 Second surface of the finishing
5 Leather-based material
6 Perforated leather-based material
10 Leather material The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a breathable leather material, the method comprising the acts of:
providing a leather-based material;
perforating the leather-based material;
providing a support body;
applying a finishing to the support body so that a later visible side of the finishing faces the support body; and
transferring the finishing to a surface of the perforated leather-based material and removing the support body.

2. The method according to claim 1, wherein the finishing is applied punctiformly to the support body.

3. The method according to claim 2, wherein the finishing is applied punctiformly to the support body by a screen-printing process.

4. The method according to claim 1, wherein the support body is perforated before applying the finishing.

5. The method according to claim 2, wherein the support body is perforated before applying the finishing.

6. The method according to claim 1, wherein the support body and the finishing are perforated before the finishing is transferred.

7. The method according to claim 1, wherein the support body and/or the finishing is heated to transfer the finishing.

8. The method according to claim 1, wherein an exposed side of the finishing is pressed to the surface of the leather-based material to transfer the finishing.

9. The method according to claim 7, wherein an exposed side of the finishing is pressed to the surface of the leather-based material to transfer the finishing.

10. The method according to claim 1, wherein the finishing comprises a primer, a coloring preparation and/or a topcoat.

11. The method according to claim 1, wherein the leather-based material is a natural leather and is tanned, stretched and/or walked before being provided.

12. The method according to claim 1, wherein the breathable leather material forms a molded skin.

13. The method according to claim 1, wherein the breathable leather material forms a motor vehicle trim element.

14. The method according to claim 1, wherein the breathable leather material forms one or more of an instrument panel, a center console, a door trim, or a seat cover.

* * * * *